J. BIRD.
Whiffletree.
No. 67,486. Patented Aug. 6, 1867.
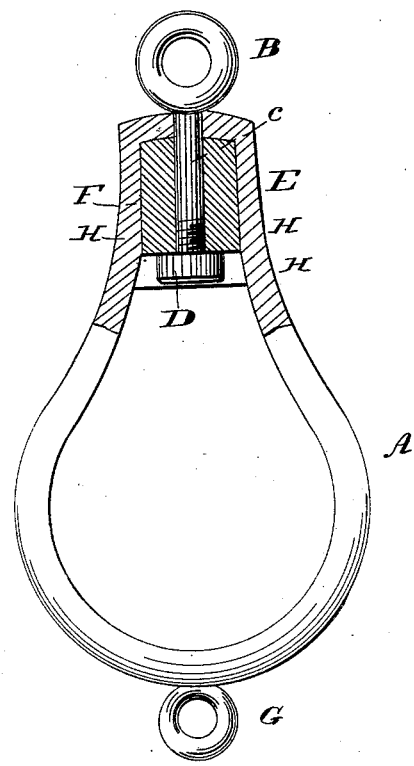

United States Patent Office.

JAMES BIRD, OF NEW YORK, N. Y.

Letters Patent No. 67,486, dated August 6, 1867.

---

IMPROVEMENT IN LOOPS FOR BEARING-CHAINS.

---

*The Schedule referred to in these Letters Patent and making part of the same.*

---

TO ALL WHOM IT MAY CONCERN:

Be it known that I, JAMES BIRD, of the city, county, and State of New York, have invented a new and useful Improvement in Loops for Bearing-Chains; and I do hereby declare that the following is a full, clear, and exact description thereof, which will enable others skilled in the art to make and use the same, reference being had to the accompanying drawing, forming part of this specification.

The drawing, consisting of only one figure, represents a bearing-loop made according to my invention, the head or upper part being shown in section.

The object of this invention is to improve the means or devices now commonly used for supporting the shafts of a cart or other vehicle from the shoulders or back of a horse or other animal.

A device now generally used consists of a chain hanging down from each side of the "saddle" or "saddle-tree," and attached directly to the shafts. Since the links of the chains cannot yield, it is evident that they transmit to the saddle, and consequently to the animal, every jolt and shock of the vehicle, and much injury is thereby occasioned to the animal. My invention is intended to relieve animals from the injurious consequences of the jolts and motions of the vehicles to which they are attached; and it consists in a peculiar construction of loop for connecting the bearing-chains to the shafts, whereby the shocks and jolts are made less sudden and violent, by means of an elastic bed or cushion through which they are transmitted.

The letter A designates a loop which supports a shaft of a cart by receiving such shaft through it. Such a loop is placed on each side of the animal to support both shafts. A ring, G, is fixed at the bottom of the loops, to enable the belly-band to be fastened to the loops. The top of the loop is rapidly narrowed, as shown in the drawing, and is formed into a head, E, whose top is closed except to allow the bolt of a swivel, C, to pass through it. The top of the bolt has a ring, D, by which the loop is connected to the usual bearing-chain, (not shown,) which hangs down from the side of the saddle. The hollow head E of the loop is filled snugly with a cushion, F, of rubber or gutta percha, or other suitable elastic substance, which is retained in place by a button or nut, D, screwed on the end of the bolt C which passes through the cushion F. The sides H of the head hold up and sustain the sides of the cushion, and consequently its elasticity is exerted chiefly in a vertical direction, enabling the cushion to sustain the force of the jolts of a vehicle with ease and without the liability of injury that attends a metallic spring. Each side of an animal, that is to say, each bearing-chain and shaft, are supplied with a like loop. When the weight of a vehicle, or of that part thereof which is supported from the back of an animal, as in the case of every two-wheeled vehicle like a cart, is suddenly raised by a jolt against the wheels or by any other cause, it immediately comes down again with violence, making the animal stagger beneath the shock. When such a jolt occurs where my improvement is applied the first and most violent effects are received by the cushion F, which will be more or less compressed, according to the load carried by the animal and according to the amount of slack given to the bearing-chain or chains, thereby to that extent relieving the animal from its effects. The cushion may be compressed to increase its tension by screwing up the nut D, if desired. The loop that receives the shaft may be of any convenient shape and size, and it may be lined or covered at bottom with an elastic cushion on which the shaft will rest.

I disclaim the invention claimed by J. D. Willoughby, in his patent of June 2, 1857, for a plough-clevis.

I claim as new, and desire to secure by Letters Patent—

Making bearing-chains with a hollow head, E, so as to receive and hold an elastic cushion, F, substantially as above shown.

JAMES BIRD.

Witnesses:
   M. M. LIVINGSTON,
   ALEX. F. ROBERTS.